US009618040B2

(12) United States Patent
Choi et al.

(10) Patent No.: US 9,618,040 B2
(45) Date of Patent: Apr. 11, 2017

(54) DOUBLE-STRUCTURE BUSH AND BEARING ASSEMBLY COMPRISING SAME

(71) Applicant: Doosan Infracore Co., Ltd., Incheon (KR)

(72) Inventors: Ji Won Choi, Gyeonggi-do (KR); Dong Pil Lim, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 14/769,191

(22) PCT Filed: Oct. 18, 2013

(86) PCT No.: PCT/KR2013/009324
§ 371 (c)(1),
(2) Date: Aug. 20, 2015

(87) PCT Pub. No.: WO2014/129719
PCT Pub. Date: Aug. 28, 2014

(65) Prior Publication Data
US 2015/0377287 A1  Dec. 31, 2015

(30) Foreign Application Priority Data
Feb. 20, 2013  (KR) .................. 10-2013-0018217

(51) Int. Cl.
*F16C 33/20* (2006.01)
*E02F 9/00* (2006.01)
(Continued)

(52) U.S. Cl.
CPC ............. *F16C 33/205* (2013.01); *E02F 9/006* (2013.01); *E02F 9/2275* (2013.01); *F16C 17/02* (2013.01);
(Continued)

(58) Field of Classification Search
CPC ....... F16C 33/122–33/127; F16C 17/02; F16C 33/201–33/206; F16C 2202/52;
(Continued)

(56) References Cited

U.S. PATENT DOCUMENTS 3,017,209 A * 1/1962 Thomas .............. F16C 11/0633
29/898.047
3,507,527 A * 4/1970 White ................ F16C 11/0633
384/203
(Continued)

FOREIGN PATENT DOCUMENTS

CN 201318395 Y 9/2009
CN 201461201 U 5/2010
(Continued)

OTHER PUBLICATIONS

International Search Report for International Patent Application PCT/KR2013/009324 mailed Jan. 10, 2014. 4 pages.
(Continued)

*Primary Examiner* — Alan B Waits
(74) *Attorney, Agent, or Firm* — K&L Gates LLP (57) ABSTRACT

The present disclosure relates to a double-structure bush usable in a joint portion which operates in low-speed and high-load, and a bearing assembly comprising the same.

12 Claims, 5 Drawing Sheets

(51) Int. Cl.
*E02F 9/22* (2006.01)
*F16C 17/02* (2006.01)

(52) U.S. Cl.
CPC ...... *F16C 2202/52* (2013.01); *F16C 2208/04* (2013.01); *F16C 2208/32* (2013.01); *F16C 2208/82* (2013.01); *F16C 2208/86* (2013.01); *F16C 2350/26* (2013.01)

(58) Field of Classification Search
CPC .............. F16C 2208/04; F16C 2208/32; F16C 2208/80–2208/90; F16C 2350/26; E02F 9/006; E02F 9/2275
See application file for complete search history.

(56) References Cited

U.S. PATENT DOCUMENTS

| | | | | |
|---|---|---|---|---|
| 4,084,863 A * | 4/1978 | Capelli | .................. | F16C 11/06 384/202 |
| 4,263,361 A * | 4/1981 | Hodes | .................... | B32B 15/14 384/297 |
| 4,368,568 A * | 1/1983 | Watanabe | .......... | B29D 99/0035 492/52 |
| 4,509,870 A * | 4/1985 | Taki | ........................ | F16C 33/20 384/296 |
| 4,541,739 A * | 9/1985 | Allen | ...................... | F16C 33/44 384/470 |
| 4,867,889 A * | 9/1989 | Jacobson | ............. | C10M 169/04 508/106 |
| 4,960,643 A * | 10/1990 | Lemelson | ............ | B23D 61/185 384/907.1 |
| 4,983,240 A * | 1/1991 | Orkin | ...................... | D04C 1/06 156/148 |
| 5,229,198 A * | 7/1993 | Schroeder | ............... | B32B 27/04 384/300 |
| 5,616,406 A * | 4/1997 | Nakamaru | ............... | C08K 3/30 428/545 |
| 5,665,441 A * | 9/1997 | Suzue | .................... | A01K 87/00 428/34.7 |
| 5,732,322 A * | 3/1998 | Nakamaru | ........... | C08K 3/0008 428/550 |
| 6,180,574 B1 * | 1/2001 | Ryan | ..................... | F16C 33/201 106/287.24 |
| 6,548,188 B1 * | 4/2003 | Yanase | .................. | F16C 33/201 384/300 |
| 7,226,213 B2 * | 6/2007 | Roos | ....................... | F16C 33/04 384/298 |
| 8,870,461 B2 * | 10/2014 | Hansen | ................... | F16C 17/12 384/291 |
| 8,979,376 B2 * | 3/2015 | Angenheister | ...... | F16C 11/0633 384/203 |
| 9,022,656 B2 * | 5/2015 | Burgeff | ................. | F16C 27/063 384/276 |
| 2004/0213492 A1* | 10/2004 | Kim | ...................... | F16C 33/201 384/300 |
| 2005/0019490 A1* | 1/2005 | Adam | .................... | B29C 43/24 427/247 |
| 2007/0065067 A1 | 3/2007 | Gartner et al. | | |
| 2010/0047612 A1* | 2/2010 | Kugo | ....................... | B22F 7/08 428/613 |
| 2014/0335336 A1* | 11/2014 | Wang | .................... | F16C 33/208 428/214 |
| 2015/0219156 A1* | 8/2015 | Okubo | ................. | F16C 33/208 442/237 |

FOREIGN PATENT DOCUMENTS

| | | |
|---|---|---|
| JP | 2004-316804 | 11/2004 |
| JP | 2006-038180 | 2/2006 |
| JP | 2007-192317 | 8/2007 |
| KR | 10-2013-0005164 | 1/2013 |

OTHER PUBLICATIONS

Office Action issued in related Chinese Patent Application No. 201380073548.2 on Nov. 30, 2016. 2 pages.

\* cited by examiner

[PRIOR ART]

DOUBLE-STRUCTURE BUSH AND BEARING ASSEMBLY COMPRISING SAME

CROSS REFERENCE TO RELATED APPLICATIONS

The present application is a National Stage of International Application No. PCT/KR2013/009324, filed on Oct. 18, 2013, which claims priority to Korean Patent Application No. 10-2013-0018217, filed on Feb. 20, 2013, the entire contents of each of which are being incorporated herein by reference.

FIELD OF THE DISCLOSURE

The present disclosure relates to a double-structure bush that can be used for joint portion which operated in low speed and high load, and a bearing assembly comprising the same.

BACKGROUND OF THE DISCLOSURE

Construction machines such as an excavator and a skid steer loader includes a plurality of joint portion, for example, the connecting portions between a boom and an arm, the connecting portions between an arm and a bucket. In the joint portion, a pin and a bush generally oscillate under lubrication condition by grease.

Figure 1:
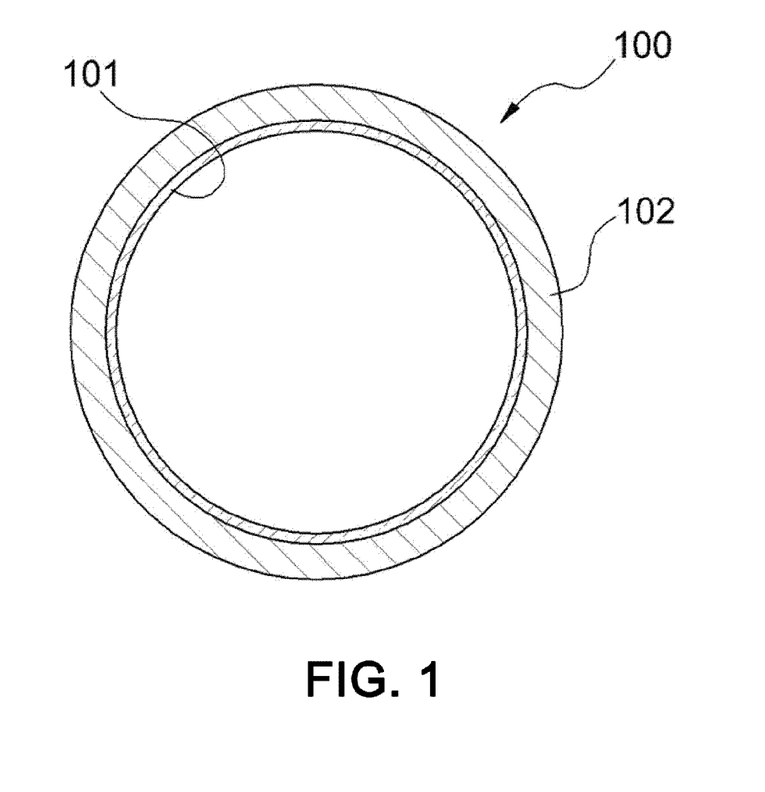
FIG. 1 is a cross-sectional view of a bush according to the present disclosure.
Figure 2:
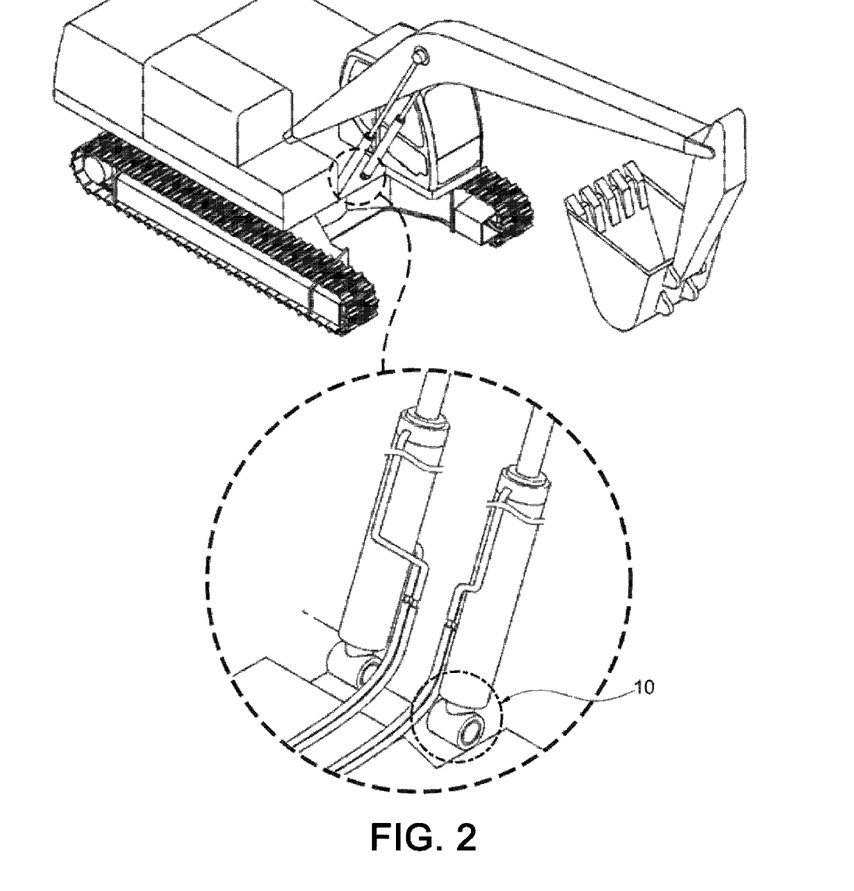
FIG. 2 is a view of an example of a joint portion of an excavator where a bush can be installed.
Figure 3:
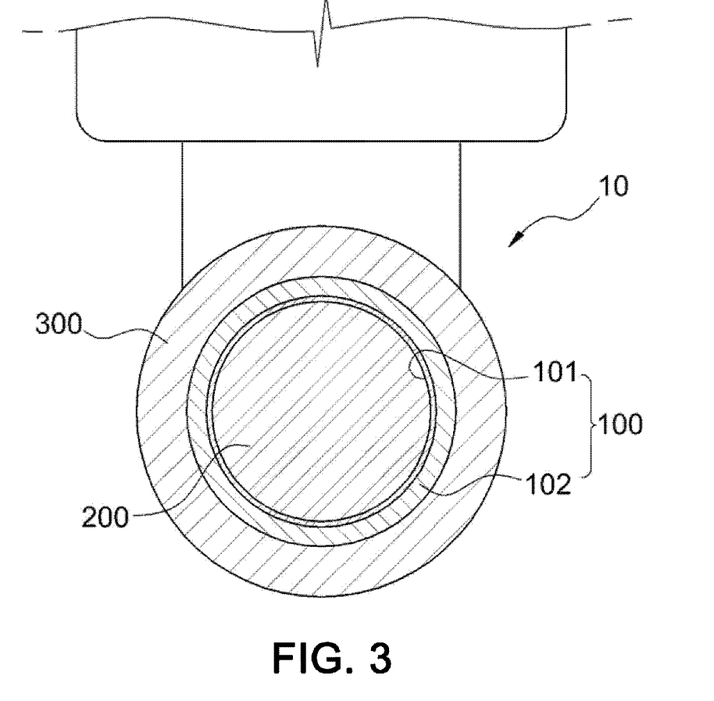
FIG. 3 is a cross-sectional view of a double-structure bush according to the present disclosure, which is installed in the joint portion illustrated in FIG. 2, perpendicular to the longitudinal direction of a pin.
Figure 4:
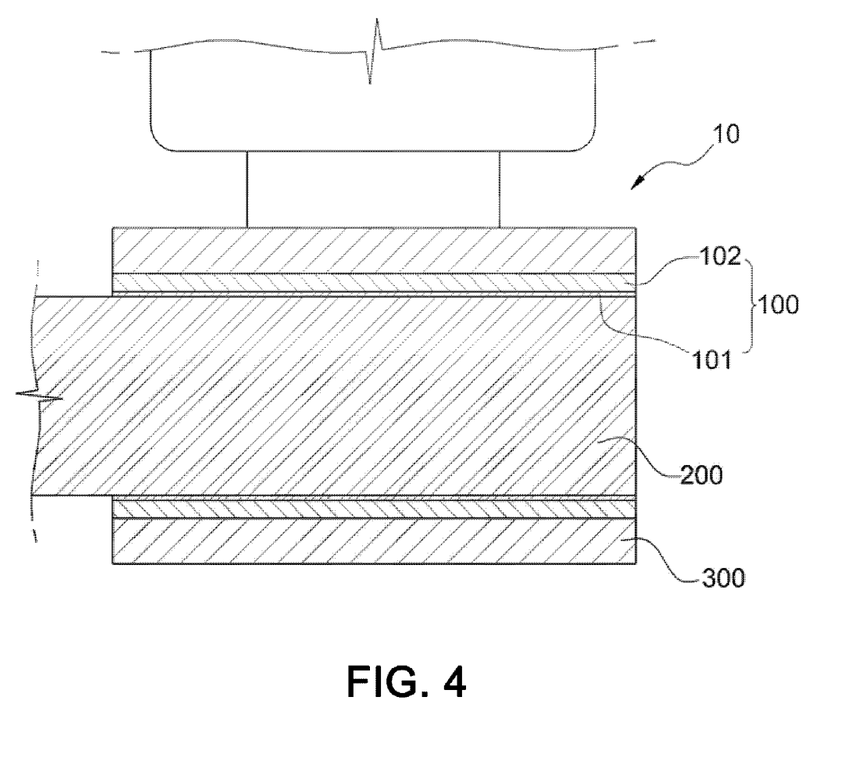
FIG. 4 is a cross-sectional view of the double-structure bush according to the present disclosure which is installed in the joint portion illustrated in FIG. 2, in the longitudinal direction of a pin.
Figure 5:
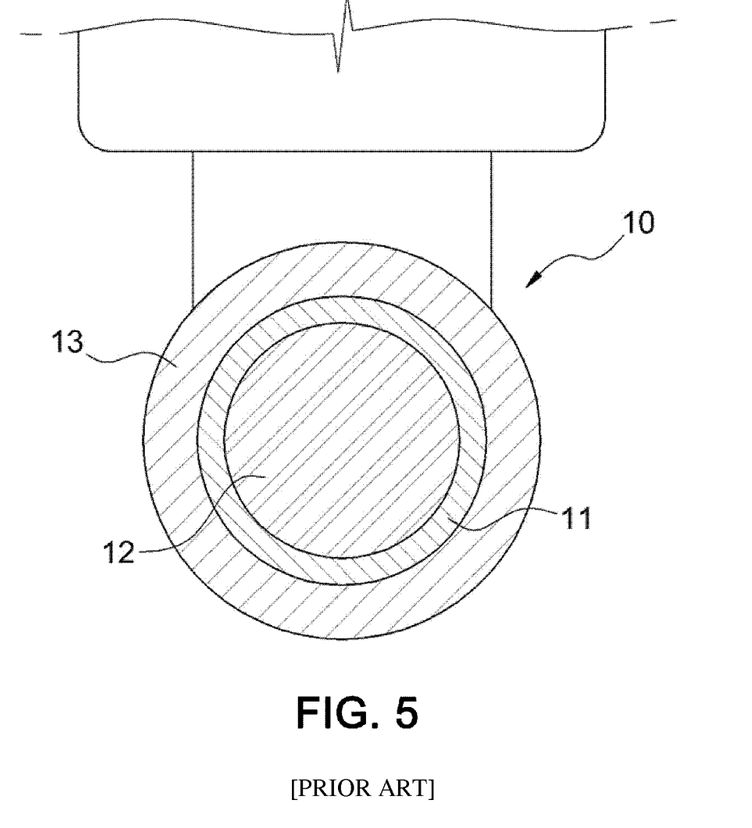
FIG. 5 is a cross-sectional view of the bush of prior art, which is installed in the joint portion illustrated in FIG. 2, perpendicular to the longitudinal direction of a pin.

FIG. 2 illustrates a front joint portion 10 of an excavator, as an example of construction machines. FIG. 5 is a cross-sectional view of a bush of the joint portion 10, taken perpendicular to the longitudinal direction of a pin. The joint portion 10, as illustrated in FIG. 5, is composed of a pin 12 connecting two members requiring a joint portion motion and a bush 11 reducing friction resistance between the pin and a pin hole. The pin 12 and the bush 11 generally oscillated under lubrication condition by grease. Further, the joint portion 10 includes, other than the pin 12 and the bush 11, a boss 13 of a housing supporting the pin and the bush, and a sealing (not illustrated) for blocking dirt.

The joint portion operates under various conditions in accordance with the connection type between the pin and the bush, the operational environment, and the type of the joint portion. They generally operate at surface pressure of about 2 to 6 kg/mm² and a speed of about 0.25 to 5 cm/sec. The values indicated above are average one. Surface pressure may rapidly increase, depending on the work load, and instantaneous surface pressure may be three times or more of an average value due to eccentric load in working, depending on the operation condition.

The bush used in high surface pressure and a low speed requires high resistance against scuffing and wear resistance. So, products of the bush with various composites and types have been developed and used.

For example, these are a metal bush of which the lubrication ability is maximized by forming grooves or dimples on the inner circumferential surface of a metallic rigid body and putting grease in the grooves or the dimples; a metal bush of which the lubrication ability is maximized by coating its surface with a self-lubricative material; and a porous-sintered metal bush in which a lubricant.

However, in the front sections of construction machines, the direction and level of load applied to each parts are difficult to be specified and also frequently changed in accordance with the configuration of the ground, the position of the machines, the geological features. Therefore, in working, each parts may be bent or eccentric load may arise, and accordingly, high load concentrates on local regions. Thus, all the parts including a bush require high-level wear resistance and shock resistance.

However, metal bushes that have been known up to now have a limited elastic strain regardless of shape thereof, so high load to local regions cannot be avoid under the condition that the direction and level of load are difficult to be specified and are changeable, as described above. Further, even if the surface of metal bushes is coated with a self-lubricative material, the lifespan of the self-lubricative material is limited, so it is difficult to keep the lubrication environment after initial stabilization step of the bush surfaces. On the other hand, when a porous metal-sintered body is continuously exposed to shock, pores in the sintered body gradually decrease from the surface where load is applied. Further, if severe, the pores are closed, so the lubricating effect by the lubricant impregnated in the sintered body may not be maintained.

SUMMARY

An embodiment of the present disclosure is to provide a bush that can exhibit excellent elasticity, returning ability, lubrication characteristic, and load resistance in joint portion, operating in high load and a low speed.

Another embodiment of the present disclosure is to provide a bearing assembly comprising the bush.

The present disclosure provides a double-structure bush made of a polymeric composite that comprises: a slide layer configured to receive a pin unit, in which the inner circumferential surface of the slide layer is in contact with the pin unit to support rotation of the pin unit; and a load support layer integrally stacked on the outer circumferential surface of the slide layer, configured to be received in a boss, in which the load support layer is in contact with the inner circumferential surface of the boss to support radial load of the pin unit, in which a softening temperature of the load support layer is 250 to 400° C., and a softening temperature of the slide layer is 120 to 180° C.

It is preferable that the softening temperature of the load support layer is 300 to 350° C. and the softening temperature of the slide layer is 140 to 160° C.

Further, the present disclosure provides a bearing assembly comprising the double-structure bush.

The present disclosure provides a bush made of a polymeric composite, which can exhibit excellent elasticity and restoring ability under a low-speed and high-load operation condition, unlike metallic bushes of prior art, so load can be uniformly distributed through deformation when local load is applied. Accordingly, it is possible prevent to abnormal wear due to stress concentration and breakage due to shock, so friction resistance and shock resistance can be improved and the lifespan can also be improved.

Further, in the present disclosure, a slide layer receiving a pin unit, in which the inner circumferential surface of the slide layer is in contact with the pin unit to support rotation of the pin unit; and a load support layer integrally stacking to cover the outer circumferential surface of the slide layer, received in a boss, in which the load support layer is in contact with the inner circumferential surface of the boss to support radial load of the pin unit, provide wherein a softening temperature of the load support layer and the slide layer are adjusted in the specific range. Accordingly, deformation of the bush that may be caused by a temperature increase due to sliding under high load does not occur.

Further, excellent lubrication characteristic may be kept even without periodic greasing.

[Description of Numerals of Drawings]

| | |
|---|---|
| 10: Joint portion | 11: Bush of prior art |
| 12, 200: Pin | 13, 300: Boss |
| 100: Bush of the present disclosure | 101: Slide layer |
| 102: Load support layer | |

DETAILED DESCRIPTION

The present will be described hereafter.

The present disclosure provides a bush made of a polymeric composite, which is characterized in that it has double structure, which includes a slide layer receiving a pin unit, in which the inner circumferential surface of the slide layer is in contact with the pin unit to support rotation of the pin unit and a load support layer integrally stacking to cover the outer circumferential surface of the slide layer, received in a boss, in which the load support layer is in contact with the inner circumferential surface of the boss to support radial load of the pin unit, wherein softening temperatures of the load support layer and the slide layer are adjusted in a specific range, respectively.

The inventors have known that when a bush is made of a polymeric composite comparing a polymeric matrix, a fiber base, and a self-lubricative material, the polymeric composite can keep high elasticity and can be restored under an operation condition of a low speed and large load, unlike metal bushes or porous sintered bushes of prior art. Further, a bush made of a polymeric composite can keep a low friction coefficient by a self-lubricative material, so it can keep an excellent lubrication environment even without periodic greasing, unlike bushes of prior art.

However, construction machines are generally used even at the polar regions or tropical regions. Accordingly, construction machines require not only a wide range of operating temperature, but also a high surface pressure level and shock resistance.

Accordingly, it is very difficult to make a bush of a polymeric composite substitute for metal bushes. Further, since most machinery parts that come in contact or interact with bushes are made of cast steel or steel, the relationship between those machinery and a bush made of a polymeric composite should also be considered. It not, problems that have not occurred in prior art may be caused. In particular, polymeric composites are easily deformed with a temperature change, unlike metal. Accordingly, the temperature dependency of polymeric composites should be not considered, in order to use a bush of a polymeric composite under various operation conditions described above.

According to the present disclosure, a double structure is formed by integrally stacking a layer (hereafter, 'load support layer') using a polymeric composite comprising a polymeric matrix, and a fiber based on the outer circumferential surface of a layer (hereafter, 'slide layer') made of a polymeric composite comprising a polymeric matrix, a fiber base, and a self-lubricative material, while softening temperatures of the slide layer and the load support layer are adjusted in a specific range by controlling the contents of the polymeric composite in each layers. Accordingly, the double-structure bush according to the present disclosure has improved wear resistance, shock resistance, and load resistance while keeping excellent lubrication characteristic, so the lifespan can be improved. In particular, the double-structure bush of the present disclosure can be used under a wide temperature condition and can be stably used under various conditions after being pressed on a boss of a housing. Further, the double-structure bush is not deformed in the slide layer even if eccentric load is applied under non-specific operation conditions, so its lifespan can be further improved as compared with the existing metallic bushes.

In detail, since the double-structure bush according to the present disclosure comprises the load support layer integrally formed on the slide layer, it has excellent load resistance under an operation condition of high load and can keep an excellent lubrication characteristic even without periodic greasing.

However, similar to metal bushes, the double-structure bush made of a polymeric composite according to the present disclosure is also machined with a tolerance larger than the inner diameter of a boss of a housing and then pressed in the boss of the housing. Accordingly, the double-structure bush according to the present disclosure, deformation of the bush due to a temperature change needs to be minimized.

In particular, since the bush is pressed on a boss of a housing, the load support layer should not be deformed under operating temperature condition to maintain the pressure force in the housing. Further, since the idling may be generated between the outer circumferential surface of the load support layer and the inner circumferential surface of the boss when the bush is used after being pressed, a high friction coefficient should be continuously maintained on the inner circumferential surface of the boss of the housing. Accordingly, the softening temperature of the load support layer is adjusted within the range of about 250 to 400° C., preferably about 300 to 350° C. by controlling the contents of components of the polymeric composite for the load support layer, when the load support layer is formed. When the softening temperature of the load support layer is less than 250° C., local deformation and reduction of friction may be caused under high temperature over 60° C. or the higher and large load over 80 MPa or the higher, so the load support layer may idle without being fixed on the inner circumferential surface of the boss. Meanwhile, when the softening temperature of the load support layer is higher than 400° C., brittleness increases at a low temperature under −40° C. or the less, so it may be cracked or broken under a shock condition of a hydraulic breaker, and the like.

Further, the slide layer of the double-structure bush according to the present disclosure operates continuously in contact with a pin. The interface temperature between the slide layer and the pin is increased due to the motion between the slide layer and the pin. Accordingly, when the softening temperature of the slide layer is not set at a predetermined level or more, the slide layer may be pressed when load concentrates on a local region such as eccentric load under non-specific work conditions, so that the slide layer may be deformed and may worn or broken. Accordingly, in the present disclosure, the softening temperature of the slide layer is adjusted within the range of about 120 to 180° C., preferably 140 to 160° C. by controlling the contents of the components in the polymeric composite for the slide layer when the slide layer is manufactured. If the softening temperature is lower than about 120° C., the inner circumferential surface of the slide layer may be deformed in continuous use condition under large load at a high temperature over 60° C. or the higher, so the lifespan of the bush may be decreased. When the softening temperature of the slide layer is higher than about 180° C., the friction coefficient of the inner circumferential surface is increased, so that the wear ratio of the slide layer may be increased, and accordingly, the lifespan of the bush may be decreased.

A bush 100 according to the present disclosure is made of a polymeric composite. The bush 100 is installed in a front joint portion of a construction machine, and supports load and makes vibration. The bush 100 has a space to receive a pin unit 200 therein, which makes movement relative to the pin unit. The bush includes a slide layer 101 and a load support layer 102 as illustrated in FIGS. 1 to 4.

The slide layer 101 receives the pin unit 200 in which the inner circumferential surface of the slide layer 101 is in contact with the pin unit 200 to support rotation of the pin unit 200. The slide layer 101 is made of a first polymeric composite comprising a first polymeric matrix, a self-lubricative material, and a first fiber base. In this case, when the mix ratio of the first polymeric matrix, self-lubricative material, and first fiber base is adjusted to 20 to 22:50 to 55:23 to 30 by weight, preferably 20.5 to 21.5:52 to 54:24 to 28 by weight, the slide layer has a softening temperature about 120 to 180° C., preferably about 140 to 160° C. The slide layer has excellent elasticity and restoration ability and can maintain an excellent lubrication characteristic even without providing periodic greasing. Thus, a low friction characteristic of the slide layer can be maintained, and accordingly, the pin unit 200 being in contact with the inner circumferential surface of the slide layer can smoothly rotate. Further, the slide layer is not deformed even in a continuous use condition in high load and a high temperature over 60° C. or the higher, so the lifespan of the bush can be improved.

The first polymeric matrix can improve thermal and chemical stability of the slide layer. The first polymeric matrix is not specifically limited and may be an epoxy-based polymer, a polyurethane-based polymer, a polyamide-based polymer, a polyalphaolefin-based polymer, a vinyl-based polymer, an acryl-based polymer, a polyacetal-based polymer, a polyether-based polymer, a polyester-based polymer, polyethersulfone-based polymer, a polysulphide-based polymer, a polypeptide-based polymer, a polyketone-based polymer, a polyolefin-based polymer, a polyimide-based polymer, a vinylidene-based polymer, and copolymers of them. These polymers may be used separately or in mixtures of two or more. When a bush is manufactured by used of the epoxy-based polymer, curing occurs rapidly, so productivity can be improved. The thermal and chemical stability of the bush can also be improved. However, when a polymer compatible with a second polymeric matrix described below is used as the first polymeric matrix, the polymeric matrixes of a slide layer and a load support layer are diffused or covalently bonded on the interface of the layers, so the load support layer can be more easily integrally stacked on the slide layer even without a use of an adhesive. Further, when compatible polymeric matrixes are used, the hardening conditions are similar. So there is no need to harden every single layer, and the work speed can be improved.

Further, the first polymeric composite includes a self-lubricative material. The self-lubricative material, which is a solid particle having low friction resistance even without a lubricant, continuously gives a low friction resistance to a bush and can prevent the inner circumferential surface of the slide layer from being burned and bonded when making a motion relative to a pin.

The self-lubricative material, is not limited and for example, may be Graphite, Graphite fluoride, $MoS_2$, $MoSe_2$, $WS_2$, $WSe_2$, $NbS_2$, $NbSe_2$, $TaS$, $TaSe_2$, $TiS_2$, $TiSe_2$, $TiTe_2$, $CeF_3$, $Ba(OH)_2$, $CdCl_2$, $CoCl_2$, $ZrCl_2$, $PbCl_2$, $PbI_2$, $BN$, $Ag_2SO_4$, $Borax(Na_2B_4O_7)$, $Talc[Mg_3(OH)_2Si_2O_{10}]$, Mica $[KAl_2(Si_3Al)O_{10}(OH)_2]$, $ZnS$, $SnS_2$, $FeS$, $CaF_2$, $LiF$, $Zn_2P_2O_7$, $Ca_3(PO_4)_2$, $Fe_2P_2O_7$, $Ca(OH)_2$, $Mg(OH)_2$, $Zn(OH)_2$, $PbO$, $ZnO$, $FeO$, $Fe_2O_3$, $Fe_3O_4$, polytetrafluoroethylene(PTFE), Fluorinated ethylene propylene (FEP), Pb, Sn, Zn, Cu, Ag, and In. Graphite, PTFE, or a mixture of them is preferable, and PTFE is more preferable.

As the self-lubricative material, a mixture of a self-lubricative material of a resin type such as PTFE and a self-lubricative material of a non-resin type such as graphite may be used. In this case, the mixing ratio of the material of a resin type and the material of a non-resin type is not specifically limited, but 10 to 90:90 to 10 by weight, preferably, 20 to 70:30 to 80, by weight. In this range, not only the lubrication characteristic of the bush, but also the wear resistance and load resistance of the bush can be further improved.

Further, the first polymeric composite includes the first fiber base. As the first fiber base is included, the strength of the slide layer can be improved.

The first fiber base may be yarn, woven fabric, knitting, and braid. When woven fabric is used, it is possible to easily adjust the thickness of a slide layer when manufacturing a bush, by using filament winding, so workability can be improved. Further, a slide layer can be formed with uniform thickness and shape when winding woven fabric around a mandrel to form the slide layer, shear deformation does not easily occur, unlike knitting or braid. As a result, the entire slide layer can have uniform strength.

The material (fiber) of the first fiber base is not specifically limited to but for example, includes a vegetable fiber such as cotton or linen, an animal fiber such as wool or silk, a regenerative fiber such as rayon, a synthetic fiber such as polyester, acryl, nylon, and polyurethane, an inorganic fiber such as a glass fiber and a carbon fiber, a metal fiber. These materials may be used separately or in mixture of two or more of them may be used. When an inorganic fiber such as a glass fiber and a carbon fiber is used, a moisture content is low, so pores are not formed in a bush after hardening and thermal stability is also excellent. Accordingly, when fabric made of an inorganic fiber is used, strength and thermal stability of a resultant bush can be improved.

Other than the components described above, the first polymeric composite may further include additives such as an initiator and a diluent within a range that does not deteriorate the lubrication characteristic of the slide layer in order to further improve the properties of the slide layer, if necessary.

The initiator is appropriately selected in accordance with the type of the first polymeric matrix. The initiator is not limited, and for example, includes a Benzo phenone-based initiator, a thioxantone-based initiator, an a-hydroxyketone-based initiator, an a-amino ketone-based initiator, a BDK (benzyl dimethyl ketal)-based initiator, a phenyl glyoxylate-based initiator, and an acyl phosphine oxide-based initiator.

Diluent, includes Butyl Glycidyl Ether (BGE), Phenyl Glycidyl Ether (PGE), Aliphatic Glycidyl Ether (C12-C14), Modifide-Tert-Carboxylic Dlycidyl Ester, DiButylPhthalate (DBP), DiOctylPhthalate (DOP), Nonyl-Phenol, and Hysol, but is not limited thereto.

Further, additives such as an antifoaming agent, a viscosity control reagent, a wetting agent, and a luster control reagent may be included in micro-amount to improve properties in hardening and adjust bubbles and the degree of luster.

The contents of the initiator, diluent, and other additives are not specifically limited and may be about 1 to 10 parts by weight in a first polymeric matrix of 100 parts by weight.

The bush 100 according to the present disclosure, as illustrated in FIGS. 1 to 4, includes the load support layer 102 integrally stacked on the slide layer 101 to cover the outer circumferential surface of the slide layer 101. The load support layer 102 may be disposed inside a boss 300 in contact with the inner circumferential surface of the boss 300 and can support radial load on the pin unit 200.

The load support layer 102 is made of the second polymeric composite including a second polymeric matrix and a second fiber base. In this case, when the mixing ratio of the second polymeric matrix and the second fiber base is 20 to 21.4:78.6 to 80 by weight, preferably 20 to 21:79 to 80 by weight, the load support layer has a softening temperature within the range of about 250 to 400° C., preferably about 300 to 350° C. Accordingly, deformation of the load support layer is minimized under a use temperature condition and a high friction coefficient relative to the inner circumferential surface of a boss of a housing can be kept. Further, the load support layer can supplement the load resistance of the slide layer. The load support layer also has improves wear resistance and shock resistance even if eccentric load is generated by the pin unit when it is in contact with the inner circumferential surface of the boss. This is because elasticity and restoration ability are excellent. The lifespan can also be improved.

The second polymeric matrix can improve thermal and chemical stability of the load support layer. The second polymeric matrix is not specifically limited and may be an epoxy-based polymer, a polyurethane-based polymer, a polyamide-based polymer, a polyalphaolefin-based polymer, a vinyl-based polymer, an acryl-based polymer, a polyacetal-based polymer, a polyether-based polymer, a polyester-based polymer, polyethersulfone-based polymer, a polysulphide-based polymer, a polypeptide-based polymer, a polyketone-based polymer, a polyolefin-based polymer, a polyimide-based polymer, a vinylidene-based polymer, copolymers of them. These polymers may be used separately or in mixtures of two or more. Curing occurs rapidly when a bush is manufactured by use of the epoxy-based polymer, so productivity can be improved and the thermal and chemical stability of the bush can be improved. However, as described above, when a polymer compatible with the first polymeric matrix is used as the second polymeric matrix, the second polymeric matrix may be diffused into the surface of the slide layer and covalently bonded with the first polymeric matrix, at the interface between the slide layer and the load support layer, so the load support layer can be easily integrally stacked on the slide layer.

Further, the second polymeric composite includes the second fiber base. The second fiber base supplements the load resistance of the slide layer by improving strength of the load support layer.

Similar to the first fiber base, the second fiber base may be yarn, woven fabric, knitting, and braid. When woven fabric in these materials is used, the thickness of the load support layer may be easily adjusted when manufacturing a bush using filament winding, so workability is improved. Further, when woven fabric is wound around a mandrel or a slide layer, shear deformation does not easily occur, unlike knitting and braid, so the same thickness and shape can be obtained. Accordingly, the entire load support layer can have uniform strength.

The material (fiber) of the second fiber base is not specifically limited and, for example, may be a vegetable fiber such as cotton or linen; an animal fiber such as wool or silk; a regenerative fiber such as rayon; a synthetic fiber such as polyester, acryl, nylon, and polyurethane; an inorganic fiber such as a glass fiber and a carbon fiber, a metal fiber. These materials may be used separately or in mixture of two or more. In these fibers, when an inorganic fiber such as a glass fiber and a carbon fiber is used, a moisture content is low, so pores are not formed in a bush after hardening and thermal stability is also excellent. Accordingly, when fabric made of an inorganic fiber is used, strength and thermal stability of a resultant bush can be improved.

Other than the components described above, in order to further improve the properties of the load support layer, if necessary the second polymeric composite may further include an additive such as an initiator, an dispersing agent, and an antifoaming agent within a range that does not deteriorate the characteristics of the load support layer such as load resistance.

The initiator is appropriately selected in accordance with the type of the second polymeric matrix. For example, the initiator included a Benzo phenone-based initiator, a thioxantone-based initiator, a hydroxyketone-based initiator, an a-amino ketone-based initiator, a BDK (benzyl dimethyl ketal)-based initiator, a phenyl glyoxylate-based initiator, and an acyl phosphine oxide-based initiator, but is not limited thereto.

The content of the initiator is not specifically limited and may be about 1 to 10 parts by weight in a second polymeric matrix of 100 parts by weight.

As described above, in the double-structure bush made of a polymeric composite according to the present disclosure, the seizure cycle is 250,000 cycles or more and a fitting-maintaining limit surface temperature at 60° C. is 90 to 100 MPa, so the bush can be used under surface pressure of 2 to 6 $kgf/mm^2$ and a sliding speed of 0.25 to 3.5 cm/sec.

Meanwhile, the double-structure bush according to the present disclosure can be manufactured in various ways.

According to an example of the present disclosure, the double-structure bush can be manufactured by a method that includes: a step of forming a first polymeric composite comprising a first polymeric matrix, a self-lubricative material, and a first fiber base by adjusting the use ratio of the first polymeric matrix, the self-lubricative material, and the first fiber base such that the softening temperature of the slide layer is 120 to 180° C.; a step of forming a second polymeric composite including a second polymeric matrix and a second fiber base by adjusting the use ratio of the second polymeric matrix and the second fiber base such that the softening temperature of a load support layer is about 250 to 400° C.; a step of winding the first polymeric composite around a mandrel to form a slide layer having a desired thickness; a step of winding the second polymeric composite on the first polymeric composite such that a load support layer having a desired thickness is formed; and a step of hardening the wound first polymeric composite and second polymeric composite. The method may further include a step of cutting in the shape of a resultant bush after the step of hardening; Further, the method may further include a step of machining the inner circumferential surface of the slide layer and/or the outer circumferential surface of the load support layer of the resultant bush after the step of hardening.

According to another example of the present disclosure, the double-structure bush can be manufactured by a method that includes: a step of forming a first polymeric composite comprising a first polymeric matrix, a self-lubricative material, and a first fiber base by adjusting the use ratio of the first polymeric matrix, the self-lubricative material, and the first fiber base such that the softening temperature of a slide layer is 120 to 180° C.; a step of forming a second polymeric composite comprising a second polymeric matrix and a second fiber base by adjusting the use ratio of the second polymeric matrix and the second fiber base such that the softening temperature of a load support layer is about 250 to 400° C.; a step of winding the first polymeric composite around a mandrel to form a slide layer having a desired thickness; a step of forming a slide layer by hardening the first polymeric composite wound on the mandrel; a step of winding the second polymeric composite on the slide layer such that a load support layer having a desired thickness is formed; and a step of forming a load support layer by hardening the wound second polymeric composite. The method may further include a step of cutting in the shape of a resultant bush after the step of forming the load support layer. Further, the method may further include a step of machining the inner circumferential surface of the slide layer and/or the outer circumferential surface of the load support layer of the resultant bush after the step of forming the load support layer.

First, a first polymeric composite including a first polymeric matrix, a self-lubricative material, and a first fiber base is formed (S100).

The step S100 may include: a step of forming a resin composition by adding a self-lubricative material to the first polymeric matrix; a step of weaving the first fiber base using a fiber; and a step of impregnating the woven first fiber base to the resin composition.

In this case, the use ratio of the first polymeric matrix, the self-lubricative material, and the first fiber base is controlled such that the softening temperature of the slide layer made of the first polymeric composite is in the range of about 120 to 180° C.

When the first fiber base is woven, it is appropriate to adjust the type of fiber and the thickness of the yarn in accordance with strength, a modulus of elasticity, a fatigue lifespan, and thickness of the resultant slide layer.

Regardless of whether it is performed before or after the step S100, the second polymeric composite including the second polymeric matrix and the second fiber base is formed (S200).

The step S200 may include: a step of weaving the second fiber base using a fiber; and a step of impregnating the woven second fiber base to the second polymeric matrix.

In this case, the use ratio of the second polymeric matrix, the self-lubricative material, and the second fiber base is controlled such that the softening temperature of the slide layer made of the second polymeric composite is in the range of about 120 to 180° C.

When the second fiber base is woven, similar to the weaving of the first fiber base, the type of fiber and the thickness of the yarn are appropriately adjusted in accordance with thickness, strength, a modulus of elasticity, and a fatigue lifespan of the resultant load support layer.

Thereafter, the slide layer 101 is formed by winding the first polymeric composite formed in the step S100 on a mandrel (S300). In this case, the number of times and angle of turning the first polymeric composite on a mandrel are adjusted such that the thickness ratio of the slide layer to the load support layer is 0.15 to 0.67.

Meanwhile, when the first polymeric matrix of the slide layer and the second polymeric matrix of the load support layer are not compatible with each other, a step of winding the first polymeric composite on a mandrel and then hardening the wound first polymeric composite may be further performed.

The hardening temperature and time are not specifically limited and may preferably be adjusted in consideration of the type of the initiator, the type of the first polymeric matrix, the type of the first fiber base, and the thickness and the number of winding times of the first polymeric composite. For example, when an aromatic polyamine-based initiator is used, it is possible to harden the first polymeric composite by heating it for about 10 to 30 minutes at a temperature of about 130 to 150° C. It is possible to minimize contraction and improve strength by performing post-hardening at the temperature condition after performing half-hardening for about one day at a room temperature.

Next, the load support layer is formed by winding the second polymeric composite formed in the step S200 around the slide layer formed in the step S300 (S400). In this case, the number of winding times of the second polymeric composite on the slide layer is controlled to one time (one layer) or more in consideration of the number of folds (number of layers) of the wound first polymeric composite such that the thickness ratio of the slide layer to the load support layer is 0.15 to 0.67. Further, the angle of the wound second polymeric composite is adjusted in consideration of desired strength of the load support layer.

Thereafter, the wound first polymeric composite and second polymeric composite are hardened (S500). Accordingly, a double-structure bush made of a polymeric composite including the slide layer 101 and the load support layer 102 integrally stacked on the outer circumferential surface of the slide layer is obtained.

The hardening temperature and time are not specifically limited, and similar to the first polymeric composite, it is preferable to adjust the hardening temperature and time in consideration of the type of the initiator, the types of the first and second polymeric matrixes, the types of the first and second fiber bases, the thicknesses and the numbers of winding times of the first and second polymeric composites, and the like. For example, when an aromatic polyamine-based initiator is used, it is possible to harden the first and second polymeric composites by heating them for about 10 to 30 minutes at a temperature of about 130 to 150° C.

However, when a step of hardening the first polymeric composite has been separately performed, the hardening temperature and time for the second polymeric composite are adjusted and hardened such that the slide layer that has been hardened and performed is not deteriorated.

Meanwhile, the obtained bush may be cut to a desired length after the step S500. Further, the pin unit 200 can smoothly rotate by machining the inner circumferential surface of the slide layer of the obtained bush with an appropriate tolerance after the step S500. Further, it is possible to prevent rotation in operation after pressing the bush inside the boss 300, by machining the outer circumferential surface of the load support layer of the bush with an appropriate tolerance.

Meanwhile, the present disclosure provides a bearing assembly (not illustrated) comprising the double-structure bush 200 described above. The bearing assembly may have a structure, for example, in which the pin unit 200 is inserted inside the inner circumferential surface of the double-structure bush 100.

Hereinafter, the present disclosure is described in more detail with reference to examples and comparative examples. However, the following examples are provided to exemplify the present disclosure and the scope of the present disclosure is not limited to the examples.

Example 1

A first polymeric composite was obtained by impregnating woven fabric made of a polyester fiber to a resin composition comprising epoxy resin, graphite, and PTFE (poly tetrafluoro ethylene particle) and then a slide layer was formed by winding the first polymeric composite on a mandrel (diameter of 71 mm). In this case, the mixing ratio of the epoxy resin, PTFE, graphite, and polyester fiber weave in the first polymeric composite was adjusted to 22:22:33:23 by weight. Thereafter, a second polymeric composite was obtained by impregnating woven fabric made of a glass fiber to epoxy resin, a load support layer was formed by winding the second polymeric composite on the slide layer formed on the surface of the mandrel, and then a double-structure bush (inner diameter: 71 mm, outer diameter: 86 mm, length: 60 mm) was obtained by thermally hardening it. In this case, the mixing ratio of the epoxy resin and the glass fiber weave in the second polymeric composite was adjusted to 21.3:78.7 by weight.

Example 2

A double-structure bush was obtained in the same manner as Example 1, except that the mixing ratio of the epoxy resin, PTFE, graphite, and polyester fiber weave of the first polymeric composite used in Example 1 was adjusted not to 22:22:33:23, but 21.5:21.5:32.3:24.7 by weight and that the mixing ratio of the epoxy resin and the glass fiber weave of the second polymeric composite was adjusted not to 21.3:78.7, but 20.8:79.2 by weight.

Example 3

A double-structure bush was obtained in the same manner as Example 1, except that the mixing ratio of the epoxy resin, PTFE, graphite, and polyester fiber weave of the first polymeric composite used in Example 1 was adjusted not to 22:22:33:23, but 20.8:20.8:31.25:27.15 by weight and that the mixing ratio of the epoxy resin and the glass fiber weave of the second polymeric composite was adjusted not to 21.3:78.7, but 20.4:79.6 by weight.

Example 4

A double-structure bush was obtained in the same manner as Example 1, except that the mixing ratio of the epoxy resin, PTFE, graphite, and polyester fiber weave of the first polymeric composite used in Example 1 was adjusted not to 22:22:33:23, but 20:20:30:30 by weight and that the mixing ratio of the epoxy resin and the glass fiber weave of the second polymeric composite was adjusted not to 21.3:78.7, but 20:80 by weight.

Comparative Example 1

A bush made of structural carbon steel of which the surface has undergone salt bath nitriding and softly coated with $MoS_2$ was used as Comparative example 1.

Comparative Example 2

A Fe—Cu-based porous sintered bush was used as Comparative example 2.

Comparative Example 3

A double-structure bush was obtained in the same manner as Example 1, except that the mixing ratio of the epoxy resin, PTFE, graphite, and polyester fiber weave of the first polymeric composite used in Example 1 was adjusted not to 22:22:33:23, but 24.4:24.4:36.6:14.6 by weight and that the mixing ratio of the epoxy resin and the glass fiber weave of the second polymeric composite was adjusted not to 21.3:78.7, but 22.2:77.8 by weight.

Comparative Example 4

A double-structure bush was obtained in the same manner as Example 1, except that the mixing ratio of the epoxy resin, PTFE, graphite, and polyester fiber weave of the first polymeric composite used in Example 1 was adjusted not to 22:22:33:23, but 23.5:23.5:35.3:17.7 by weight and that the mixing ratio of the epoxy resin and the glass fiber weave of the second polymeric composite was adjusted not to 21.3:78.7, but 22:78 by weight.

Comparative Example 5

A double-structure bush was obtained in the same manner as Example 1, except that the mixing ratio of the epoxy resin, PTFE, graphite, and polyester fiber weave of the first polymeric composite used in Example 1 was adjusted not to 22:22:33:23, but 22.2:22.2:33.4:22.2 by weight and that the mixing ratio of the epoxy resin and the glass fiber weave of the second polymeric composite was adjusted not to 21.3:78.7, but 21.5:78.5 by weight.

Comparative Example 6

A double-structure bush was obtained in the same manner as Example 1, except that the mixing ratio of the epoxy resin, PTFE, graphite, and polyester fiber weave of the first polymeric composite used in Example 1 was adjusted not to 22:22:33:23, but 19.4:19.4:29.1:32.1 by weight and that the mixing ratio of the epoxy resin and the glass fiber weave of the second polymeric composite was adjusted not to 21.3:78.7, but 19:81 by weight.

Experimental Example 1

Evaluation of Properties

Softening temperatures, fitting amounts, fitting-maintaining limit surface pressure at 60° C., friction coefficients, and seizure cycles of the bushes manufactured by Example 1 to 4 and Comparative examples 1 to 6 were measured. It was also examined if they were broken after a low-temperature test. The measurement result was listed in the following Table 1.

1-1. Softening Temperature

Temperature or the bush was increased at 120° C./hr with load of 50 N applied to the bushes from a clamp (length: 3 mm and cross-sectional area: 1.000±0.015 mm²), and then temperature was measured when an end of the clamp moved into the bushes from the initial position. In table 1, $T_b$ is the softening temperature of the load support layer and $T_s$ is the softening temperature of the slide layer.

1-2. Fitting Amount

The amount of contraction of the inner diameter of the bushes was measured by comparing the inner diameter of the contracting bushes with that of the bushes before forcible fitting, after forcibly fitting the bushes into a boss of a housing. In this case, the amount of contraction of the inner diameter of the bushes was referred as the fitting amount.

1-3. Pressure-Maintaining Limit Surface Pressure

Surface pressure was measured when idling started due to reduction of pressure between a housing and the outer circumferential surface of the bushes when load was applied step by step under a non-lubricative atmosphere, a vibration angle of 90°, a vibration speed of 1 m/min, and temperature 60° C.

1-4. Friction Coefficient and Seizure Cycle

Real-time friction coefficients were measured by infinitely repeating tests under an infinite repeated load condition of non-lubricative atmosphere, a vibration angle of 90°, a vibration speed of 1 m/min, and load of 1 to 21 tons, with the initial cycle, where a friction coefficient was 0.35 or more, as the seizure cycle.

1-5. Whether or not there is Breakage after Low-Temperature Test

Real-time friction coefficients were measured by infinitely repeating tests under an infinite repeated load condition of non-lubricative atmosphere, temperature of −40° C., a vibration angle of 90°, a vibration speed of 1 m/min, and load of 1 to 21 tons. Whether or not there was breakage was checked up to a seizure cycle with the initial cycle, where a friction coefficient was 0.35 or more, as the seizure cycle.

As can be seen from Table 1, the bushes of Examples 1 to 4, in which the softening temperatures of the load support layers were adjusted within 250 to 400° C. and the softening temperatures of the slide layer were adjusted within 120 to 180° C. had pressure-maintaining limit surface pressures at 60° C., similar to those in Comparative examples 1 and 2, and had Seizure cycles of 260,000, higher than those in Comparative examples 1 and 2. In particular, the bushes in Examples 2 and 3 in which the softening temperatures of the load support layer were adjusted within 300 to 350° C. and the softening temperatures of the slide layers were adjusted within about 140 to 160° C. showed very high seizure cycle 300,000 cycles or more.

Further, in the bushes in Examples 1 to 4, the pressure-maintaining limit surface pressures at 60° C. and seizure cycles were excellent in comparison to the bushes in Comparative examples 3 to 6 in which the softening temperatures of the load support layers were adjusted out of the range of 250 to 400° C., or the softening temperatures of the slide layers were adjusted out of the range of 120 to 180° C., and the bushes were not broken even after a low-temperature test at −40° C.

The invention claimed is:

1. A double-structure bush made of a polymeric composite, the double-structure bush constructed and arranged to be placed between a boss and a pin unit inserted thereinto, and the double-structure bush comprising:
   a slide layer configured to receive the pin unit, in which the inner circumferential surface of the slide layer is in contact with the pin unit to support rotation of the pin unit; and
   a load support layer integrally stacked on the outer circumferential surface of the slide layer, configured to be received in the boss, in which the load support layer is in contact with the inner circumferential surface of the boss to support radial load of the pin unit,
   wherein the slide layer is made of a first polymeric composite and the load support layer is made of a second polymeric composite, wherein the first polymeric composite comprises a first polymeric matrix, a self-lubricative material, and a first fiber base, and

TABLE 1

| | $T_b$ (° C.) | $T_s$ (° C.) | Fitting amount (mm) | Fitting-maintaining limit surface pressure (MPa) (60° C.) | Friction coefficient | Seizure cycle | Whether there is breakage after low-temperature test (−40° C.) |
|---|---|---|---|---|---|---|---|
| Example 1 | 250 | 120 | 0.2 | 90 | 0.05 | 261,000 | X |
| Example 2 | 300 | 140 | 0.2 | 95 | 0.05 | 321,000 | X |
| Example 3 | 350 | 160 | 0.2 | 95 | 0.07 | 309,000 | X |
| Example 4 | 400 | 180 | 0.2 | 100 | 0.08 | 275,000 | X |
| Comparative example 1 | — | — | 0.2 | 100 | 0.08 | 165,000 | X |
| Comparative example 2 | — | — | 0.2 | 95 | 0.08 | 250,000 | X |
| Comparative example 3 | 100 | 60 | 0.2 | 60 | 0.05 | 58,000 | X |
| Comparative example 4 | 150 | 80 | 0.2 | 75 | 0.05 | 116,000 | X |
| Comparative example 5 | 200 | 100 | 0.2 | 80 | 0.05 | 202,000 | X |
| Comparative example 6 | 450 | 200 | 0.2 | 100 | 0.08 | 222,000 | ○ | wherein a softening temperature of the load support layer is higher than that of the slide layer.

2. The double-structure bush of claim 1, wherein the second polymeric composite comprises a second polymeric matrix and a second fiber base.

3. The double-structure bush of claim 1, wherein the softening temperature of the load support layer is 250 to 400° C., and the softening temperature of the slide layer is 120 to 180° C.

4. A bearing assembly comprising the double-structure bush of claim 1.

5. The bearing assembly of claim 4, wherein the second polymeric composite comprises (a) a second polymeric matrix and (b) a second fiber base.

6. The bearing assembly of claim 4, wherein the softening temperature of the load support layer is 250 to 400° C., and the softening temperature of the slide layer is 120 to 180° C.

7. The bearing assembly of claim 6, wherein the softening temperature of the load support layer is 300 to 350° C. and the softening temperature of the slide layer is 140 to 160° C.

8. The bearing assembly of claim 4, wherein the bush is used at surface pressure of 2 to 6 kgf/mm$^2$ and a sliding speed of 0.25 to 5 cm/sec.

9. A double-structure bush made of a polymeric composite, the double-structure bush constructed and arranged to be placed between a boss and a pin unit inserted thereinto, and the double-structure bush comprising:

a slide layer configured to receive the pin unit, in which the inner circumferential surface of the slide layer is in contact with the pin unit to support rotation of the pin unit; and a load support layer integrally stacked on the outer circumferential surface of the slide layer, configured to be received in the boss, in which the load support layer is in contact with the inner circumferential surface of the boss to support radial load of the pin unit, wherein a softening temperature of the load support layer is 250 to 400° C., and a softening temperature of the slide layer is 120 to 180° C., wherein the slide layer is made of a first polymeric composite comprising (a) a first polymeric matrix, (b) a self-lubricative material, and (c) a first fiber base.

10. The double-structure bush of claim 9, wherein the softening temperature of the load support layer is 300 to 350° C. and the softening temperature of the slide layer is 140 to 160° C.

11. The double-structure bush of claim 9, wherein the load support layer is made of a second polymeric composite comprising (a) a second polymeric matrix and (b) a second fiber base.

12. The double-structure bush of claim 9, wherein the bush is used at surface pressure of 2 to 6 kgf/mm$^2$ and a sliding speed of 0.25 to 5 cm/sec.

* * * * *